C. G. WINTER.
MEANS FOR LISTING CHECKS.
APPLICATION FILED AUG. 14, 1914.

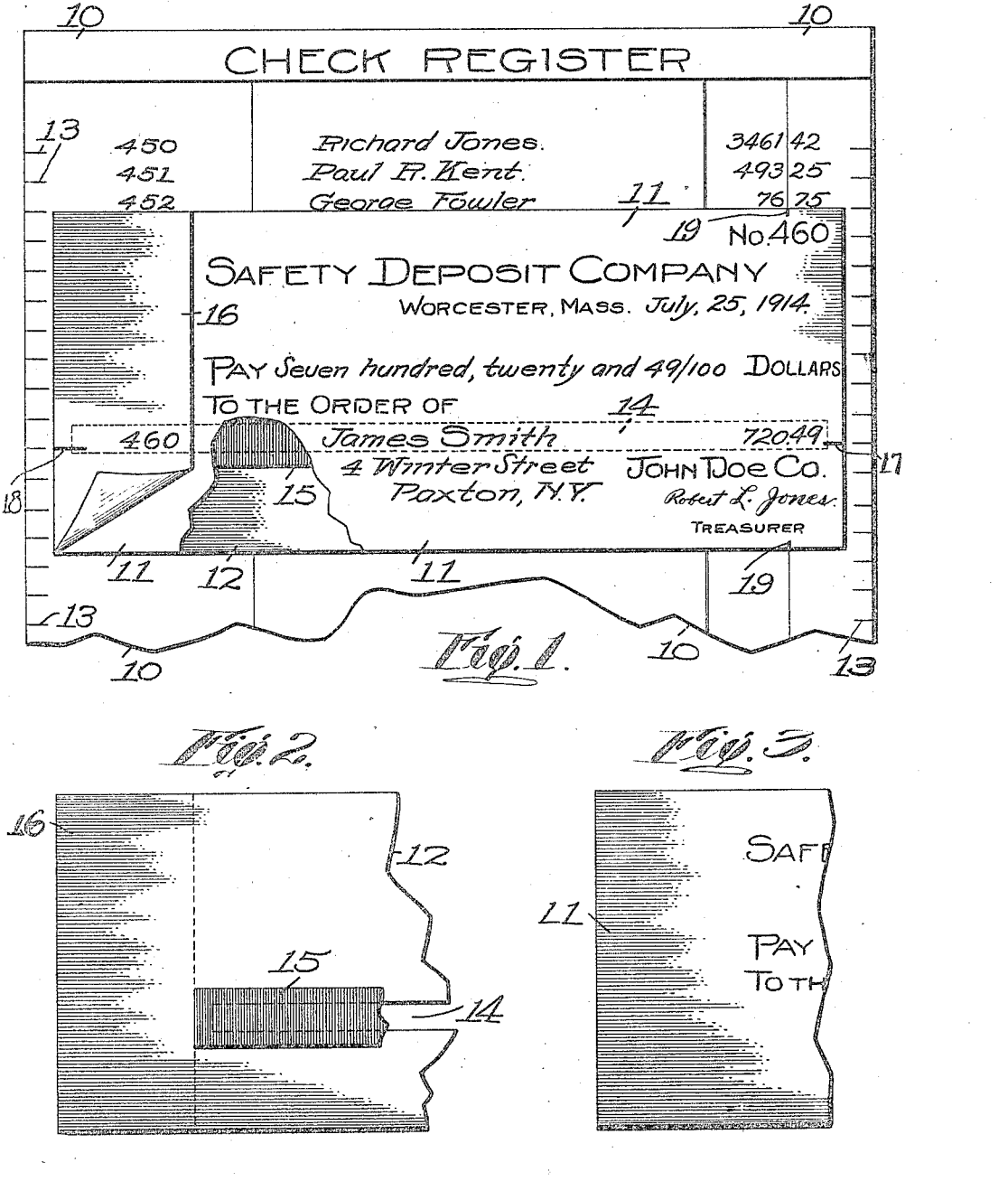

1,206,745.

Patented Nov. 28, 1916.
2 SHEETS—SHEET 2.

CHECK REGISTER

| | | |
|---|---|---|
| Frank B. Leland | 42 | 76 |
| Ralph W. Rogers | 364 | 49 |
| Walter B. Shaw | 4762 | 13 |

No. 60

SAFETY DEPOSIT COMPANY

WORCESTER, MASS. July 25, 1914.

PAY Four hundred, thirty and 27/100 DOLLARS

TO THE ORDER OF
James Smith
4 Winter Street
Paxton, N.Y.

430.27

JOHN DOE CO.
Robert L. Jones
TREASURER

1914:  5/3   75.16
       6/16  42.36
LARS   7/4    5.19
       7/21 307.56

30.27

No. 60

5/3   75.16
6/16  42.36
7/4    5.19
7/21 307.56

Witnesses:
C. F. Mason
G. C. Hartnett

Inventor
C. G. Winter
by Attorneys
Southgate & Southgate

UNITED STATES PATENT OFFICE.

CHARLES G. WINTER, OF WEBSTER, MASSACHUSETTS.

MEANS FOR LISTING CHECKS.

1,206,745.

Specification of Letters Patent.

Patented Nov. 28, 1916.

Application filed August 14, 1914. Serial No. 856,859.

*To all whom it may concern:*

Be it known that I, CHARLES G. WINTER, a citizen of the United States, residing at Webster, in the county of Worcester and State of Massachusetts, have invented a new and useful Means for Listing Checks, of which the following is a specification.

This invention relates to a means for listing checks or similar instruments, and particularly to means by which certain data may be simultaneously entered upon the check and upon a check register or record sheet.

For the purposes of such a register it is desirable to list merely the check number, the name of the payee, and the amount of the check. It is customary, however, in writing checks under modern commercial conditions to place more or less additional data upon the face of the check. When the checks are to be mailed in the so-called "outlook" or window envelops this data includes the post office address of the payee. The check may also show the separate items which combine to make up the amount of the check, together with other data which it is not necessary or desirable to reproduce upon the check register.

It is the object of my present invention to provide means whereby selected data appearing upon the face of a check may be simultaneously entered upon the check and upon a check register, while other data entered upon the check is omitted from the register.

With this object in view, my invention contemplates in its preferred form the use of an intermediate sheet adapted to be inserted between the check and a suitable check register or record sheet, and so constructed and disposed that data written above certain portions thereof will be transferred to the register, while data written above other portions of said sheet will not be transferred.

My invention further consists in certain devices, arrangements, and combinations of parts which will be hereinafter described and more particularly pointed out in the appended claims.

Two preferred forms of my invention are shown in the drawings in which,

Figure 1 is a face view of the preferred form, showing the several elements in their operative relation; Fig. 2 is a partial face view of one end of the intermediate sheet; Fig. 3 shows a portion of the face of the check; Fig. 4 is a view similar to Fig. 1 showing a modified form of my invention; Fig. 5 is a detail view of one end of the intermediate sheet in its modified form; Fig. 6 is a detail view showing one end of the check shown in Fig. 4; and Fig. 7 shows the end portion of the check detached and reversed.

Referring to the preferred form shown in Fig. 1, my improved means for listing checks comprises essentially three elements; a check register or record sheet 10, a check or other negotiable instrument 11, and an intermediate sheet 12.

The check register comprises a sheet which may conveniently be slightly broader than the length of the check, said sheet being provided with a plurality of horizontal spaces adapted to receive selected data recorded on the face of the check. As shown in the drawing, this data comprises the check number, the name of the payee, and the amount of the check. The spaces for receiving this data may be separated by ruled dividing lines, or they may be indicated merely by suitable marks or other indicia 13 on one or both side margins of the sheet. The check may be of any usual form, it being merely desirable that the name of the payee and the amount of the check shall appear upon a single line.

In order to transfer the selected data to the check register, I provide the intermediate sheet 12 which is placed between the check and the register. In the form under consideration, the sheet or shield 12 consists of a sheet of blank paper having a slot or opening 14 formed therein, said opening being covered by a narrow strip of carbon paper 15 secured in position on the sheet. When this sheet is introduced between the check 11 and the check register 10, the opening 14 is so positioned that it will underlie that portion of the check on which appears the data selected for record. In order to readily assemble the check and the intermediate sheet in their proper relative position, it is desirable to form the intermediate sheet of the same size as the check.

It is usually customary to print the check number upon the check when the checks are manufactured. In order to permit the check number to be recorded upon the check register without duplicating this number upon the face of the check, I provide a flap or extension 16 (Fig. 2) secured to the left-hand end of the intermediate sheet.

When the parts are assembled for use, the flap 16 is brought forward and folded down outside of the left-hand end of the face of the check. It is then possible to write the number of the check upon the flap, this number being duplicated upon the check register by the carbon strip, while the flap itself covers the face of the check and prevents the check number from being printed thereon.

Where the checks are written upon a typewriter, the several elements are assembled as shown in Fig. 1, the check and its intermediate sheet being alined upon the check register by reference to the indicia 13. For this purpose the check 11 may be provided at one or both ends with corresponding marks or other indicia 17 and, where the flap 16 is used, a corresponding mark 18 may be placed thereon.

In order that the figures indicating the amount of the different checks may be properly alined vertically upon the check register, the upper or lower edge of the check, or both, may be provided with marks 19 for locating the check laterally upon the register.

In Fig. 3 I have shown the left-hand end of a check as it appears after removal from beneath the flap 16, this figure showing clearly the omission of the check number from this portion of the check.

Instead of providing the intermediate sheet with the flap 16 and writing the check number at the time the check is made out, I may provide a column of numbers at one edge of the check register, as shown in Fig. 4, by reference to which any particular check may be alined in proper position. When the number is thus placed upon the check register the flap 16 may be omitted.

It will be obvious that instead of using the narrow strip of carbon paper secured to the intermediate sheet, I may provide a loose sheet of carbon paper of the same size as the check and for certain purposes to be hereinafter described this arrangement is desirable. The most important and essential feature of my invention lies in the provision of the opening 14 corresponding in position to the location of the data to be preserved upon the check register.

In the form shown in Fig. 4, the carbon sheet 20 is of the same size as the check itself and underlies the entire surface thereof. On the check there shown, the several items which make up the amount of the check are written at one end of the check.

It is sometimes desirable to preserve these several items for reference and for this purpose I provide the right-hand end of the check with an extension 21 adapted to be folded back and to be interposed between the back of the carbon sheet and the front of the intermediate sheet. This extension may have the check number printed upon the back side thereof, as viewed in Fig. 7, or the number may be placed upon the check and upon the extension simultaneously at the time the check is written. After the check has been written and the selected data simultaneously placed upon the check register, the extension 21 may be detached and will then appear as shown in Fig. 7, presenting in convenient form the check number and the dates and amounts of the several items comprising the amount of the check.

It will be obvious that the intermediate sheet used in Fig. 4 may also be provided with a flap corresponding to the flap 16 in Fig. 2 so that the check number may be written upon the check register as in Fig. 1, instead of alining the check with the previously printed check numbers shown in Fig. 4.

Having thus described my invention, it will be seen that I am able at a single operation to write all data appearing upon the check and at the same time to enter upon the check register the selected data which it is desirable to preserve. In this way a single horizontal space may contain the selected data from each check, regardless of the amount and location of the other data which is placed upon the check at the time the register record is made.

It is to be understood that the word check as used in the claims is intended to include all kinds of negotiable instruments containing selected data which it is desirable to enter upon a register or record sheet.

Having thus described my invention, it will be evident that other changes and modifications may be made therein by those skilled in the art without departing from the spirit and scope thereof as set forth in the claims, and I do not wish to be limited to the details herein disclosed, but

What I do claim is:—

1. A means for listing checks comprising a check register adapted to receive selected data from a plurality of checks, a check having a horizontal space for the same data, and an intermediate sheet comprising a shield of plain paper of substantially the same size and outline as said check and having a relatively narrow horizontal slot therein, and a strip of carbon paper underlying said slot, said intermediate sheet being adapted to be positioned between said check and said register with said slot and carbon paper underlying the horizontal space on said check and thereby causing transfer of the data in said space to said register while transfer of other data from the check to the register is prevented by the shield of plain paper, and said check and register having coöperating index marks adjacent their vertical edges by reference to which they may be relatively positioned.

2. A means for listing checks, comprising a check register having a plurality of horizontal spaces each adapted to contain the number of the check, the name of the payee, and the amount of the check, a check having a horizontal space for the name of the payee and the amount of the check, and an intermediate sheet adapted to be positioned between said check and said register, said sheet having an opening therein adapted to overlie said space on said register, said opening being covered with carbon paper and said sheet having a flap at one end adapted to overlie a portion of the face of the check, whereby data may be placed upon the register without causing it to be reproduced upon the face of the check.

3. A means for listing checks, comprising a check register having a plurality of horizontal spaces, each adapted to contain the name of the payee and the amount of the check, a check having a horizontal space for the same data, and an intermediate sheet adapted to be positioned between said check and said register, said sheet having an opening therein covered with carbon paper and adapted to underlie the space on said check containing said data, said check having an extension on one end adapted to be folded beneath the carbon sheet and to receive additional data written near one end of the check, while at the same time the transfer of said data to the check register is prevented.

In testimony whereof I have hereunto set my hand, in the presence of two subscribing witnesses.

CHARLES G. WINTER.

Witnesses:
J. O. B. BRYANT,
JOHN CUMMINGS.